Patented Oct. 10, 1922.

1,431,259

UNITED STATES PATENT OFFICE.

CLARENCE I. ROBINSON, OF ELIZABETH, NEW JERSEY, ASSIGNOR TO STANDARD OIL COMPANY OF NEW JERSEY, OF NEW YORK, N. Y., A CORPORATION OF NEW JERSEY.

RECOVERY OF BY-PRODUCTS OF PETROLEUM REFINING.

No Drawing.   Application filed October 3, 1919.   Serial No. 328,205.

*To all whom it may concern:*

Be it known that I, CLARENCE I. ROBINSON, a citizen of the United States, residing at Elizabeth, in the county of Union and State of New Jersey, have invented a new and useful Improvement in the Recovery of By-Products of Petroleum Refining, of which the following is a specification.

My invention relates to the art of petroleum refining, and more particularly to a method of recovering certain valuable by-products, the production of which I have discovered to be incidental to the refining operation. The invention will be fully understood from the following specification:

As is well known, a considerable proportion of the light petroleum products of the character of gasoline and kerosene results from pyrogenetic operation, the pyrogenesis being either accomplished at atmospheric pressure, as in the case of the distillation of crude oil and coking stills, or, at pressures of several atmospheres in special stills constructed for that purpose.

In this destructive distillation or cracking of heavy petroleum oils for the production of lighter oils, it has heretofore been found that there is produced a considerable proportion of unsaturated hydrocarbons, olefines, diolefines and other unsaturated bodies.

Preparatory to marketing these light products of pyrogenesis, it is the universal practice to subject them to a refining operation designed to remove malodorous, chromo-genetic and highly unstable constituents.

The usual refining operation involves, first, treatment of the oil with strong sulphuric acid. The acid sludge resulting from this treatment is commonly diluted with water for the separation of the oily constituents and the dilute acid then restored to its original strength by evaporation of the excess water content. This evaporation, or at least the initial stages thereof, is commonly carried out in open lead-lined pans, or optionally in concentrating towers of the general form of Gay-Lussac towers, in which the weak acid passes in counter-current to the heated gas.

I have discovered that the general process as above described results in the formation of valuable by-products of relatively low-boiling point and capable of being recovered, as will hereinafter be set forth. As a specific example, the following is given:

13,000 barrels of light petroleum products resulting from the pyrogenesis of gas oil in cracking stills at a pressure of about 5 atmospheres are subjected to treatment with 65,000 pounds of sulphuric acid of 66° B. (about 90% acid), the treatment being carried on in the ordinary lead-lined oil agitators and at atmospheric temperature, i. e., 55 to 75° F. The resulting sludge has added thereto about an equal volume of water, and for purposes of the present invention I have found it desirable to effect this dilution as soon as possible after the completion of the oil treatment.

Upon dilution the sludge readily separates into an oily and aqueous layer. The aqueous layer, consisting essentially of dilute sulphuric acid (about 33° B.), is drawn off and subjected to further treatment, as follows:

This dilute acid (7500 gallons in the example given) is continuously fed into a distillatory apparatus which may be of a form of the ordinary lead-lined acid concentrating pan, the pan being equipped, for purposes of the present invention, with a tight lead cover or dome which in turn is connected with a water-cooled condenser. The rate of feed of the dilute acid to the pan is such as to obtain in the latter about 6 to 7% of distillate, that is, about 445 gallons of distillate per 7500 gallons of dilute acid fed through the pan. After passing through this first pan, in which the percentage of distillate named is taken off. the acid is then passed through succeeding pans, towers or other concentrating devices, in accordance with the usual practice.

The 6 to 7% distillate obtained, as above described, collects in the receiver in two layers, an upper oil layer of a volume of about 180 gallons, and a lower aqueous layer of a volume of about 265 gallons. These two layers are separated and separately treated as follows:

The oil layer is first washed with about 75 gallons of water and the mixture allowed to stratify. The wash water is added to the previously separated aqueous layer. This aqueous mixture thus obtained is found to consist of a dilute solution of water soluble alcohol, principally iso-propyl alcohol. It is neutralized with a small quantity of lime and subsequently rectified or re-distilled in any suitable type of apparatus to produce an alcohol of about 90° concentration suitable for the market. The odor of the rectified product may be much improved by the use of a small quantity of plumbate of soda. The alcohol obtained in this way, in the example given, will amount to about 31 gallons.

The oily layer of the distillate, after washing with water as above described, is miscible in all proportions with 90% alcohol or with naphtha. It is found to consist of light polymerized oils, admixed with oil soluble alcohol, such as amyl-alcohol; has a gravity of 35.5° B., and a fractional distillation as follows:

Distillation.

Start—95.

| | | |
|---|---|---|
| 95 to 122 | 11.9% | 74.8° B. |
| 122 to 158 | 7.3 | 68.5 |
| 158 to 176 | 3.9 | 54.5 |
| 176 to 212 | 24.0 | 40.2 |
| 212 to 302 | 16.0 | 26.0 |
| 302 to 320 | 8.9 | 25.0 |
| 320 to 338 | 5.0 | 25.0 |
| 338 to 356 | 6.4 | 24.8 |
| 356 to 374 | 3.0 | 24.5 |
| 374 to 392 | 6.5 | 23.9 |
| | 92.9 | |

From the gravity and boiling points of the distillate, it is apparent that a large part of this material consists of alcohols, the percentage of hydrocarbons being relatively small.

This mixture of oil and higher alcohols, forms a desirable constituent of motor fuels, it having been found that about two per cent. by volume of the material in question added to ordinary gasoline of a grade used for motor fuel (60° B. gravity 90% off of 356° F., end point 420° F.) produces better performance of an engine in the way of increased thermal efficiency.

It is assumed that in the process above described, the treatment of the light petroleum oil containing unsaturated constituents with sulphuric acid under the conditions described results in the conversion of a considerable proportion of these unsaturated constituents into corresponding substituted sulphuric acid, i. e., propyl sulphuric acid, amyl sulphuric acid, etc. The subsequent dilution of the acid sludge required for the separation thereof is believed to hydrolyze these acids into the corresponding alcohols, the main water soluble alcohol produced being iso-propyl. Since the iso-propyl alcohol is more readily soluble in water than in oil, while the higher alcohols are substantially insoluble in water, the washing of the oily layer of the distillate with water somewhat increases the yield of substantially pure iso-propyl alcohol.

The process above described may be conveniently applied wherever "cracked" light hydrocarbons are produced in substantial quantities and subsequently refined for the market. The only additional equipment required for the initial recovery of the alcohol by-products is the lead-lined still or equivalent covered pan in which the first stages of the acid concentration process are carried out. It will of course be apparent that a somewhat higher percentage of distillate may be taken off in the manner described with a consequent increase of the total yield of by-product alcohol. The extent to which this collection of distillate in the acid restoring process may be profitably employed obviously depends upon the precise characteristics of the oil which has been treated, i. e., the proportion and character of the unsaturated content thereof, the controlling conditions as to gravity of the acid, temperature and length of treatment in the refining operation, and the dilution of the sludge acid. The foregoing example is intended merely as illustrative of what may be accomplished in a representative refining process.

While I have in the foregoing described in considerable detail one method of carrying out my invention, together with my conclusions as to the probable nature of the reactions and the chemical identification of the useful products obtained, it is understood that this is illustrative only and for the purpose of making clear the nature and mode of application of the invention, and that I do not regard the invention as limited to the details of procedure given, nor as dependent upon the soundness or accuracy of the hypotheses which have been advanced.

What I claim is—

1. The method of recovering valuable products from lighter hydrocarbon oils resulting from pyrogenesis and containing a substantial proportion of unsaturated constituents which consists in treating such oils with sulphuric acid of about 90 per cent. strength and at a temperature of about 55 to 75° F., separating the resultant acid sludge from the treated oil, diluting the sludge with water, separating the oily constituents from the aqueous acid of the diluted sludge, subjecting the aqueous acid to distillation, collecting and stratifying the distillate, and recovering the water soluble alcohol content in the aqueous layer of the distillate.

2. In the process according to preceding claim 1, further increasing the yield of water soluble alcohol by washing with water the supernatant oily layer of the distillate to extract therefrom the dissolved water soluble alcohols.

3. The method of treating acid sludge resulting from the refining of "cracked" gasoline which consists in diluting such sludge for the separation thereof, subjecting the separated dilute acid to distillation, and recovering the higher alcohols from the first portions of the distillate.

4. The herein described mixture of higher alcohols, having a gravity of about 35.5° B. and a boiling-point range from about 95 to 392, substantially 40 per cent. of such mixture boiling between 176 to 302° B.

CLARENCE I. ROBINSON.